T. L. HOLLE.
GLASS MELTING FURNACE.
APPLICATION FILED APR. 9, 1913.
1,111,258.
Patented Sept. 22, 1914.
2 SHEETS—SHEET 1.
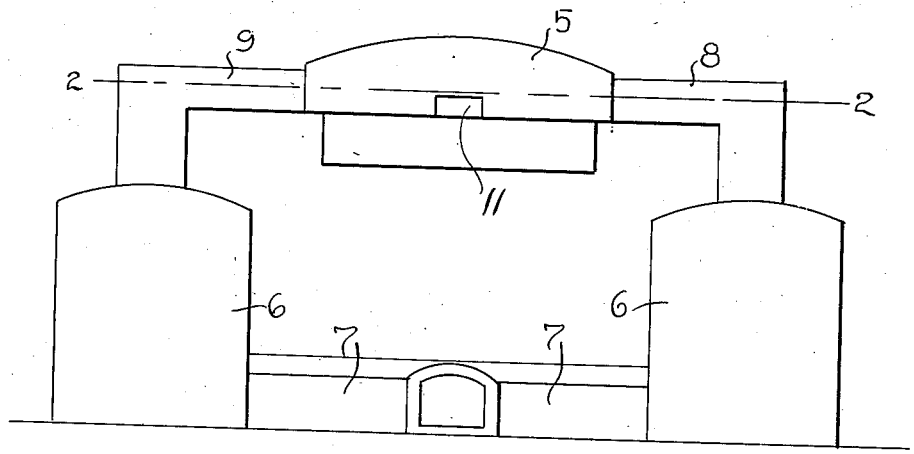
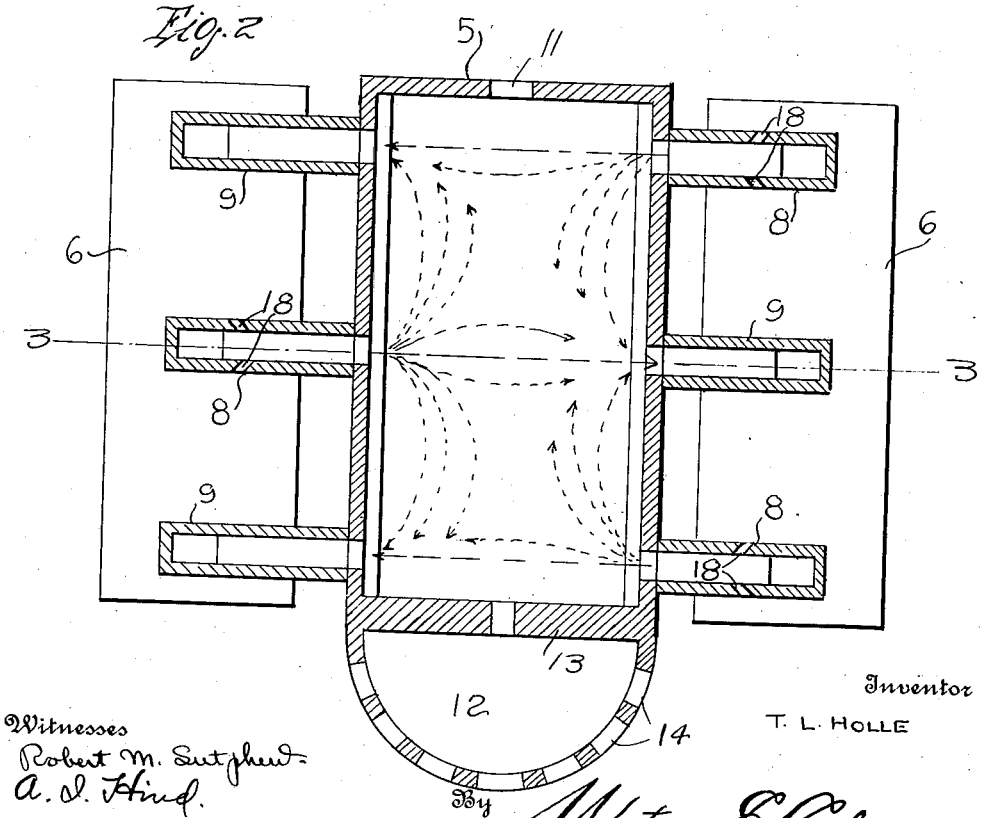
Witnesses
Robert M. Sutphen
A. I. Hind
Inventor
T. L. HOLLE
By Watson E. Coleman
Attorney T. L. HOLLE.
GLASS MELTING FURNACE.
APPLICATION FILED APR. 9, 1913.
1,111,258.
Patented Sept. 22, 1914.
2 SHEETS—SHEET 2.
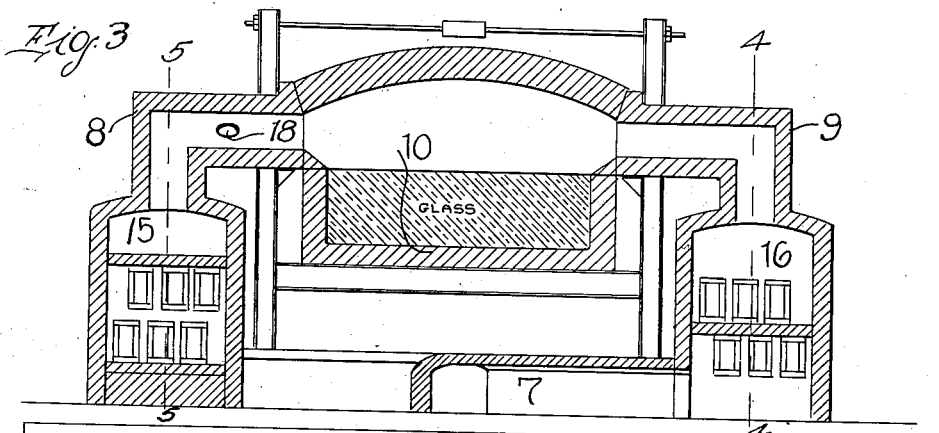
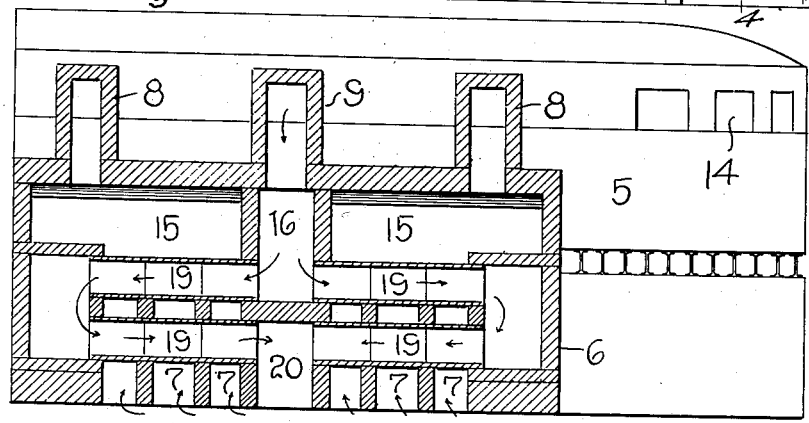
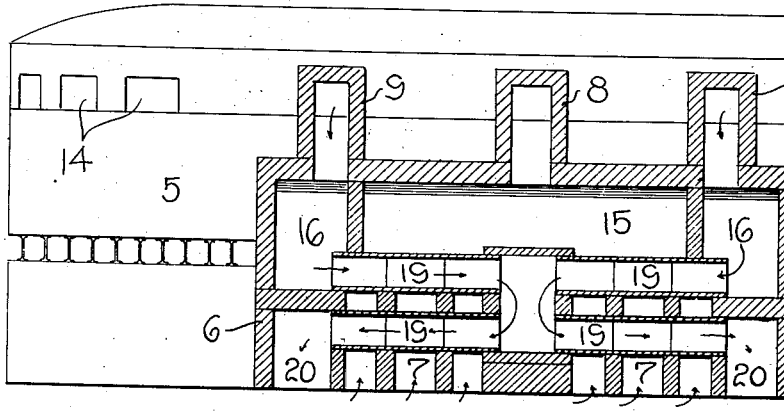
Inventor
THEODOR L. HOLLE

UNITED STATES PATENT OFFICE.

THEODOR L. HOLLE, OF ST. LOUIS, MISSOURI.

GLASS-MELTING FURNACE.

1,111,258.  Specification of Letters Patent.  Patented Sept. 22, 1914.

Application filed April 9, 1913. Serial No. 760,005.

*To all whom it may concern:*

Be it known that I, THEODOR L. HOLLE, a subject of the Emperor of Germany, residing at St. Louis, State of Missouri, have invented certain new and useful Improvements in Glass-Melting Furnaces, of which the following is a specification, reference being had to the accompanying drawings.

This invention relates to glass melting furnaces and has for its primary object to provide an improved furnace of the non-reversible heat regenerative type wherein an equable distribution of the heat throughout the area of the furnace is obtained, thus admitting of the building of the furnace in any desired length.

Another and more specific object of the invention resides in the provision of the furnace proper and multiple non-reversible heat generators connected to opposite sides of said furnace by alternately arranged waste gas down-take flues and burner flues, by which arrangement of the flues, the desired end above referred to is attained.

With the above and other objects in view as will become apparent as the description proceeds, the invention consists in certain constructions, combinations and arrangements of the parts that I shall hereinafter fully describe and claim.

For a full understanding of the invention, reference is to be had to the following description and accompanying drawing, in which—

Figure 1 is an end elevation of a glass melting furnace embodying the present invention; Fig. 2 is a horizontal section taken on the line 2—2 of Fig. 1. Fig. 3 is a section taken on the line 3—3 of Fig. 2; Fig. 4 is a section taken on the line 4—4 of Fig. 3; Fig. 5 is a section taken on the line 5—5 of Fig. 3.

Referring in detail to the drawings, 5 designates the furnace proper which may be of any ordinary or approved construction and as illustrated embodies a melting tank 10 to which sand and soda ash may be fed through an opening 11 in one end of the furnace. The melting tank at its opposite end is separated from the refining tank 12 by the bridge wall 13. The refining tank or chamber is of semicircular form, the bridge wall being provided with an opening through which the molten glass may flow to said refining tank. The end wall of the furnace is provided with a plurality of "gathering holes" 14 through which glass may be removed from the refining tank.

6 designates two heat regenerators of the nonreversible type. Each of these regenerators is provided with one or more air chambers 15 and waste gas receiving chambers 16 located between said air chambers. Atmospheric air enters the regenerators through the passages 7 and rises into the air chambers 15.

It is to be understood that the present invention is not limited to any specific construction of the furnace or the heat regenerators, but is of general application to such structures as now employed in the art. Heretofore, the length of the furnace proper has been limited when the same is employed with non-reversible heat regenerators because of the fact that a proper distribution of the heat and flame throughout the area of the interior of the furnace, could not satisfactorily be obtained. I aim, by means of the present invention, to obviate this objection and to produce a furnace which may be made of indeterminate length by means of a particular arrangement of the down-take flues for the waste gas which connect the regenerators with the furnace, with relation to the burner flues connecting the air chambers of the regenerators with the furnace, which I will now proceed to describe in detail.

Referring more particularly to Fig. 2 of the drawings, it will be observed that each side of the furnace proper is connected to one of the regenerators by means of the burner flues 8 and the gas down-take flues 9, said flues being alternately arranged. The furnace proper is connected to the regenerators by means of the burner flues 8 which connect the air chambers 15 with the opposite side walls of the furnace above the melting tank 10 and the gas down take flues 9 connect the furnace with the waste gas chambers 16 of the regenerators. The burner flues 8 are provided with fuel feed openings 18 through which fuel may be fed into said flues. When the air has been sufficiently heated in the regenerators to ignite the fuel in the burner flues 8, the flame and products of combustion are emitted from the burner flues to the interior of the furnace above the glass melting tank 10.

It is further to be observed that the down-take flues upon one side of the furnace are located opposite to the burner flues upon the other side of the furnace. While I have illustrated only three such flues upon each side of the furnace, in the drawing, it is to be understood that this alternate arrangement of the down-take and burner flues may be carried out indefinitely. Assuming that the flame issues into the furnace from the central or burner flue, at the left hand side of Fig. 2, the gases are drawn into the down-take flues upon either side of this burner flue and also into the down-take flue upon the other side of the furnace which is located directly opposite said burner flue. It will thus be apparent that the flame and heat is distributed over a comparatively wide area. The flame issuing from the two burner flues shown on the right of Fig. 2, is drawn as indicated by the arrows, into the down-take flue arranged between the same and partially into the opposed down-take flues on the opposite side of the furnace. The waste gases as indicated by the arrows in Figs. 4 and 5 of the drawings pass from the chamber 16 through the passages 19 into the outlet flues 20. In this manner, all parts of the furnace will be heated to practically the same temperature which is essential to the proper reduction or melting of the materials in apparatus of this character.

From the foregoing, it is believed that the construction and manner of operation of my improved glass melting furnace will be clearly and fully understod. By means of the above described arrangement of the down-take and burner flues, it will be obvious that the furnace may be built of any desired length without sacrificing its efficiency in operation. The building cost of the furnace is also practically the same as that now incurred in the building of furnaces in general use.

Having thus described the invention, what is claimed is:

1. A glass melting furnace of the non-reversible regenerative type having burner and down-take flues alternately arranged upon each side of the furnace body and connecting the same with a regenerator, the respective burner and down-take flues upon one side of the furnace being located directly opposite a down-take and burner flue respectively upon the other side of the furnace, substantially as and for the purpose specified.

2. A glass melting furnace having a plurality of burner and outlet flues arranged in opposite relation and opening into each side of the furnace, the flues upon one side of the furnace being so arranged with respect to the corresponding flues on the opposite sides of the furnace whereby the products of combustion are drawn in several directions through the interior of the furnace and equally distributed to the several outlet flues.

In testimony whereof I hereunto affix my signature in the presence of two witnesses.

THEODOR L. HOLLE.

Witnesses:
ALBERT HERMAN GUELS,
EDW. GEORGE KOLLMEIER.